April 8, 1930.  A. F. GILLET  1,753,651
WINDSHIELD WIPER
Filed May 29, 1929
Fig.1.
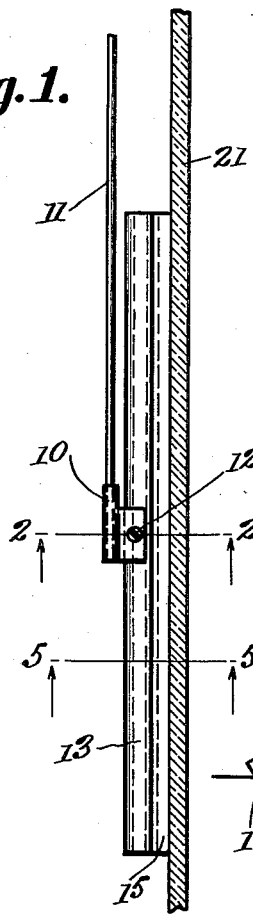
Fig.2.
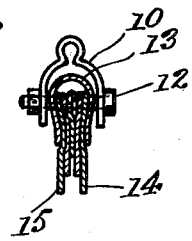
Fig.3.  Fig.4.
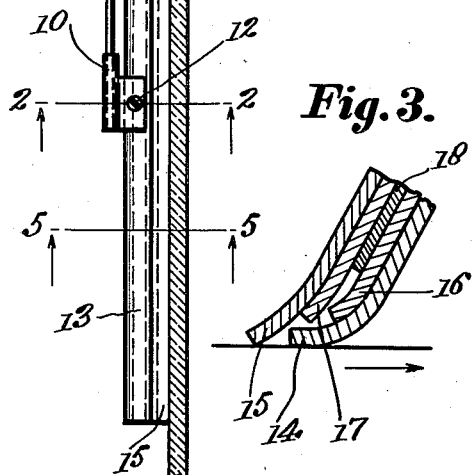 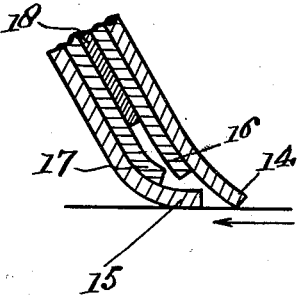
Fig.5.
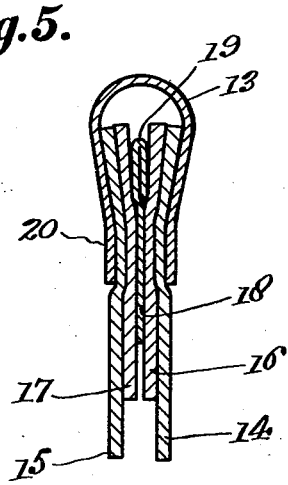
Inventor
A.F.Gillet
By Arthur H. Sturges
Attorney Patented Apr. 8, 1930

1,753,651

UNITED STATES PATENT OFFICE

ALEXIS F. GILLET, OF OMAHA, NEBRASKA, ASSIGNOR TO JUBILEE MANUFACTURING COMPANY, OF OMAHA, NEBRASKA, A CORPORATION OF NEBRASKA

WINDSHIELD WIPER

Application filed May 29, 1929. Serial No. 367,055.

The present invention relates to automobile windshield cleaning devices, and has for an object to provide an improved wiper for removing rain or the like from the exposed surface of the windshield of an automobile whereby the operator of said vehicle may have a clear view of the road and pedestrians thereon.

Another object of the invention is to provide an improved windshield wiper in which the edges of the wiping strip which come into contact with the windshield glass will be maintained in alinement and thereby present a uniformly good wiping surface to the windshield glass.

It is well known in the art of windshield cleaning implements that the rubber or wiping strips frequently become warped through age or get out of alinement because of the tampering thereof by authorized persons. It also frequently occurs in the manufacture and assembly of these article as heretofore constructed that the rubber wiping strip by improper original placement in their holders would not be truly alined. It is a further object of the invention to avoid these difficulties with prior devices.

It is a still further object of the invention to provide an improved windshield wiper in which a plurality of wiping strips are included having a plurality of wiping edges in contact with the windshield glass, said edges being re-inforced whereby to positively clean the glass.

With the foregoing and other objects in view, the invention will be more fully understood from the following description and will be more fully pointed out in the attached claims.

In the drawings wherein like parts are denoted by like reference symbols thruout several views.

Figure 1 is a vertical sectional view taken through a windshield glass showing the improved wiper in side elevation and with parts broken away.

Figure 2 is a cross section taken on the line 2—2 in Figure 1.

Figure 3 is an enlarged fragmentary cross-sectional view taken through the improved wiper and showing the same in one position of movement.

Figure 4 is a similar view showing the wiping device on the backward stroke of its movement.

Figure 5 is a cross-sectional view taken on an enlarged scale substantially on the line 5—5 in Figure 1.

Referring more particularly to the drawings, 10 designates a holder, which is carried on the lower free end of the wiping arm 11. The arm 11, in accordance with the usual practice, is operated by a small electric or suction motor but the operating means is not important. The arm 11 is given by the motor an oscillating movement over the outside face of the windshield glass. The holder 10 is of substantially U-shape in cross-section as indicated in Figure 2, and it is adapted to envelop the sheath 13, being pivoted thereto as by the bolt or detent 12. By this arrangement the sheath 13 and the wiping strips carried thereby are adapted to have a pivotal movement about the bolt 12 to enable the windshield wiper to conform to the surface of the windshield glass. The sheath 13 is also of substantially U-shape in cross-section. As indicated in Figure 5 it resembles a horseshoe. Being of resilient metal, the side flanges thereof are adapted to clamp yieldably upon the wiping strips that are inserted therein. The wiping strips are usually of rubber and therefore flexible and resilient which add to the resiliency of the holder and enables the strips to be held tightly and yieldably in place.

The strips are, of course, comparatively thin and flexible. These strips are shown to be four in number, including an outer pair of long strips 14 and 15 and an inner pair of shorter strips 16 and 17. All of the strips are of substantially the same length as the sheath 13 although they may be longer or shorter if desired. The strips may also be of all the same thickness but the width of the outer strips 14 and 15 is appreciably greater than the width of the inner strips 16 and 17 whereby the outer strips 14 and 15 project to an appreciably greater degree beyond the end of the sheath 13 and toward the surface of the windshield glass. Between the inner plies 16 and 17 is disposed a reinforcing element 18, which is preferably in the form of a thin metal plate preferably possessing resilient characteristics. The plate is preferably thin and flexible but it possesses a body and rigidity not had by the rubber strips and it therefore acts in the capacity of a backing for such rubber strips.

The arrangement between the metal plate 18 and the wiping strips is such that the outer edge of the plate 18 is preferably closer to the adjacent edges of the sheath 13 than are the outer edges of the wiping plies 14, 15, 16 or 17. In other words the wiping plies or strips are wider than the plate 18. This construction leaves the outer edges of the plies free and permits the same to be flexed as indicated in Figures 3 and 4 in wiping over the surface of the windshield glass. The inner edge of the sheet metal 18 is preferably folded over upon itself as indicated at 19 in Figure 5, thereby forming a wedge or a thickened part along the inner edge of the strip and the remainder of the strip is very thin.

The metal of the sheath 13 is preferably compressed or constricted at the point 20 opposite the thinner portion of the metal strip 18 and below the wedge 19. This pinching of the sheath 13 co-operates with the wedge 19 whereby to hold the strip tightly in place, the inner ends of the strips tending to flare outwardly because of the presence of the wedge part 19 and the constricted neck portion 20 of the sheath tending to bind the parts in place and put them under compression as indicated in Figure 5. The strips will thus be held tightly in place and against local creeping or dislocation. The plies will therefore be maintained in substantially perfect alinement, and prevented from becoming loose in the sheath. The windshield glass is indicated at 21.

In the use of the device, the entire wiping elements comprising the sheath 13 and various strips carried thereby will be vibrated across the outer surface of the windshield glass 21. This motion will be derived from the suction or electric motor through the arm 11, in accordance with the usual practice. The arm is, of course, made from spring steel and is so bent and arranged as to subject the wiping elements or strips to a pressure upon the surface of the windshield glass 21. The sheath may also oscillate upon the pivot bolt 12 during its movements across the glass 21. The wiper will describe a segment of a circle in its movements over the glass.

As shown in Figure 3, when the wiper is traveling toward the right as indicated by the arrow in this figure, the ply or strip 14 as to its outer projecting edge will double under the strips 16 and 17 and it will bear very strongly upon the surface of the windshield glass owing to its own inherent resiliency and also that imparted to it by the resiliency of the companion shorter strip 16 which reinforces it. A certain degree of rigidity will be imparted to both the strips 14 and 16 by the metal plate 18. During this movement the ply 14 will function to remove all obstructions such as snow, ice and water from the windshield glass 21. The ply 15 which follows it will have a light wiping contact with the glass whereby to remove any residue of moisture left after the passage of the ply 14. Upon the return stroke, as illustrated in Figure 4, the ply 15 will double under the device and will function for rough wiping in which action it will be reinforced by the shorter ply 17. The following ply 14 will serve for removing the residue of moisture as above explained.

I do not wish to be restricted to the size, form and proportions of the various parts, and obviously changes could be made in the construction herein described without departing from the spirit of my invention, it being only necessary that such changes fall within the scope of the appended claims.

I claim:

1. In a windshield wiper, a substantially U-shaped flexible and resilient sheath, long resilient outer wiping members carried in said sheath, shorter resilient wiping elements carried in said sheath and inwardly of the longer wiping element, a stiffening metal member having an enlarged inner edge portion disposed between the narrower elements, the outer edges of said elements and the reinforcing member being disposed in stepped relation, and said sheath being pinched together near its outer opened end to compress the resilient strip upon the reinforcing member.

2. In a windshield wiper, a sheath, long resilient outer wiping members carried in said sheath, shorter resilient wiping members also carried in said sheath inwardly of and in contact with the outer longer wiping members, a stiffening rigid member disposed between and in contact with the shorter wiping elements inwardly of the working ends thereof, the outer working ends of said wiping members and the adjacent end of the stiffening member being disposed in stepped relation.

In testimony whereof, I have affixed my signature.

ALEXIS F. GILLET.